UNITED STATES PATENT OFFICE.

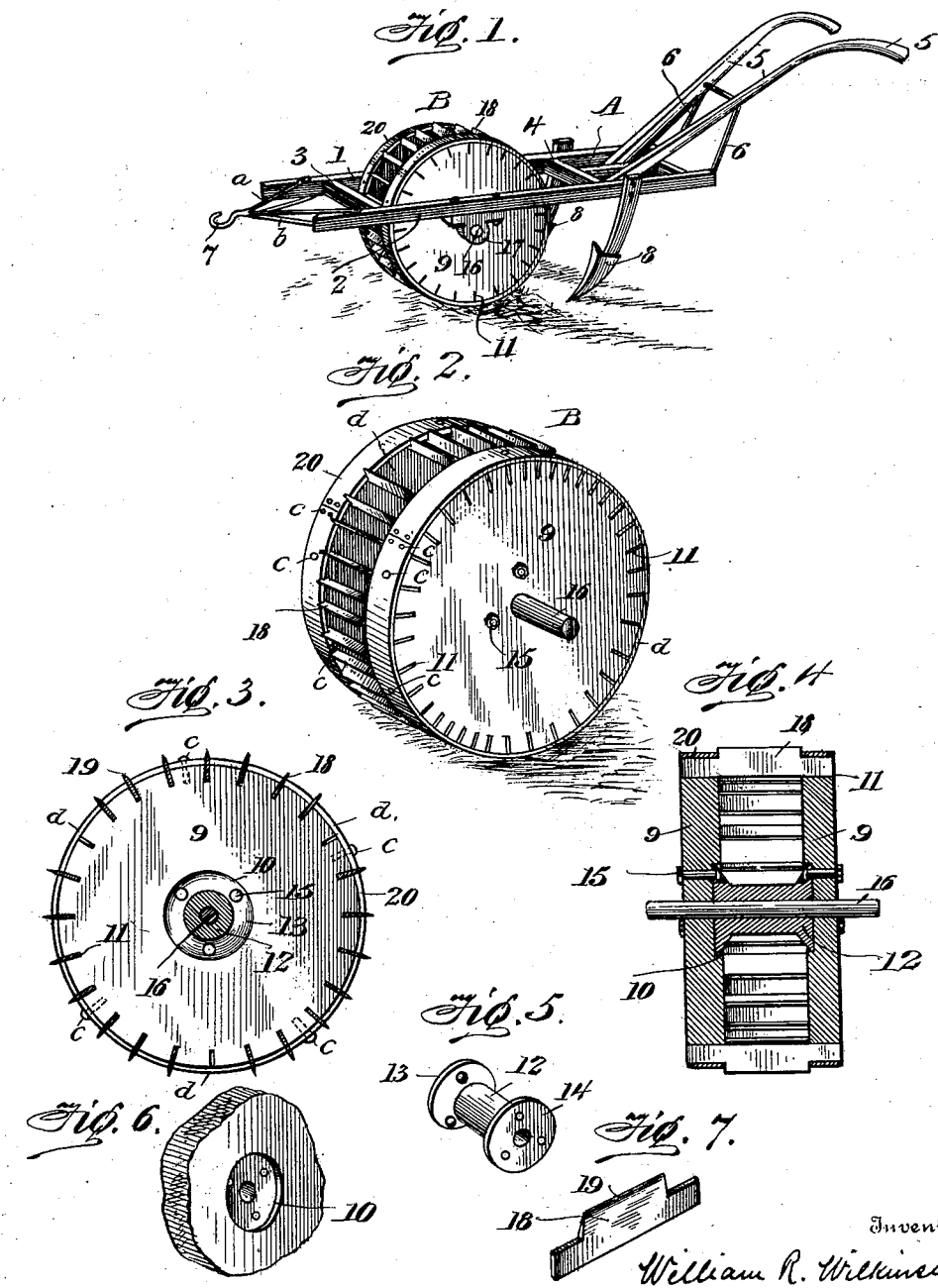

WILLIAM R. WILKINSON, OF CLAXTON, GEORGIA.

COTTON-CHOPPER.

SPECIFICATION forming part of Letters Patent No. 700,109, dated May 13, 1902.

Application filed April 4, 1901. Serial No. 54,330. (No model.)

*To all whom it may concern:*

Be it known that I, WILLIAM R. WILKINSON, a citizen of the United States, residing at Claxton, in the county of Tattnall and State of Georgia, have invented certain new and useful Improvements in Cotton-Choppers; and I do hereby declare the following to be a full, clear, and exact description of the invention, such as will enable others skilled in the art to which it appertains to make and use the same.

My invention relates to improvements in cotton-choppers of that kind or style wherein a wheel provided with a series of knives or choppers is employed to cut or chop down the young sprouts at stated intervals, distances, or spaces in the progress of the machine over the row of plants; and the objects are to simplify and improve the existing art by providing a rotary chopper wherein the knives may be conveniently changed to mutilate or chop the standing plants for determined distances and pass over standing plants at the ends of such spaces.

It is also an object to provide such a cotton-chopper as will be simple in construction, effective in the work designed, and which may be readily and conveniently assembled in its parts and separated when desired to facilitate transportation or for other purposes.

With these objects in view the invention consists in the novel construction of parts and their operative combinations, as will be hereinafter fully specified and the novelty thereof particularly pointed out and distinctly claimed.

I have fully and clearly illustrated the improvements in the accompanying drawings, wherein—

Figure 1 is a perspective view of a cotton-chopper having my improved chopping-wheel mounted therein. Fig. 2 is a detail perspective of the chopping-wheel removed from the plow-frame. Fig. 3 is a central vertical section through the chopping-wheel. Fig. 4 is a central vertical section at right angles to Fig. 3. Fig. 5 is a detail view of the hub of the wheel which connects the disks. Fig. 6 is a detail view of one of the disks, showing the recess or seat into which the end of the hub sets. Fig. 7 is a detail view of one of the chopping knives or blades.

Referring to the drawings, A designates the plow-frame, which may be of any suitable construction adapted to the purposes intended. As illustrated in the drawings, it consists of parallel side rails 1 2, connected at the proper places at or near the respective ends by substantial front and rear cross bars or pieces 3 4. At the rear portion of the frame are secured the lower ends of the handles 5 5, inclined upward to the rear and extending sufficiently to admit the workman to handle the machine efficiently. The handles are connected by cross-bars or rounds and are further braced by vertical brace-pieces 6 6, connected to the rear end portions of the side rails of the frame, substantially as shown.

At the front ends of the side rails of the frame are secured brace-rods *a b*, meeting at their outer ends, and at their union a hook 7 is arranged to carry a singletree, to which an animal may be attached. At the rear portion of the frame, at opposite sides thereof, are secured plows 8 8, which may be of any proper form to direct soil against the plants left standing after the wheel has chopped others down and to cover the remains of those cut off or beaten down.

B designates the chopping-wheel, comprising duplicate disks 9, oppositely disposed and formed with central recesses or seats 10 and having in their perimetral faces the requisite number of radial slots 11, in which the ends of the knives are seated, as indicated in the drawings. The disks are firmly held in relative position by means of a sleeve or spool 12, constituting the hub of the wheel, formed with annular end flanges 13 14, the flanged ends fitting snugly within the central circular seats in the disks. The disks are held to the hub by means of bolts 15, let through from the outside of the disks and suitably projected into the heads or flanges of the hub, as shown. Through the hub is arranged the shaft 16, having its ends journaled in boxes or other bearings 17, secured to the under faces of the side rails of the frame, substantially as indicated in the drawings.

The knives or choppers 18 consist of suitable plates of steel having their ends fitted in the radial slots of the disks and their chopping or cutting portions 19 extended a proper distance beyond the upper edges of the end portions, as shown. The upper edges of the knives lie flush with the perimetral faces of the disks and are detachably and removably held in their seats and in relation to the disks by means of steel tires 20, bearing on the disks and upon the ends of the knives, the inner edges of the tires bearing against the end walls or shoulders of the knives. The tires are detachably held in position on the disks and over the ends of the knives by means of bolts c, let through them into the disks, and their ends are in like manner secured. The disks and connecting-hub are preferably made of cast-iron and the knives and tires of steel. The knives are placed in the periphery of the wheels at equal distances apart for a number and then a larger space is left, as at d, between one series and the commencement of the next series of knives, the enlarged spaces being made to accommodate the plants to be left standing, the standing plants being free and safe by reason of spaces having been formed between the ends of the series sufficient to admit them to project into the interior of the wheel. When it is desired to change the distance of the cut of the knives and make the distance between standing plants shorter or longer, the bolts from the tires are removed and the tires taken off. The desired rearrangement may then be made and the tires replaced and secured in position.

What I claim is—

1. In a cotton-chopper, a chopping-wheel comprising oppositely arranged and alining disks having central circular recesses or seats and oppositely-arranged radial knife-slots, a hub formed with annular flanges at the ends seated within the central circular recesses of the disks, a shaft in the hub, chopping-knives having their ends lodged in the radial slots of the disks, and tires about the disks over the ends of the knives, substantially as described.

2. In a cotton-chopper, a chopping-wheel comprising oppositely arranged and alining disks having central circular recesses or seats in the inner faces and oppositely-arranged radial knife-slots in their perimetral faces, a hub formed with annular flanges at the ends seated within the central circular recesses of the disks, bolts projected through the disks into the ends of the hub, a shaft in the hub, chopping-knives having their ends removably lodged in the radial slots in the disks, tires on the disks to hold the knives in position, and bolts through the tires and entering the disks to detachably hold the tires to the disks, substantially as described.

In testimony whereof I affix my signature in presence of two witnesses.

WILLIAM R. WILKINSON.

Witnesses:
J. D. KENNEDY,
J. P. MOORE.